United States Patent [19]

Inslee et al.

[11] Patent Number: 5,046,451

[45] Date of Patent: Sep. 10, 1991

[54] FISH FARM AND HYDROPONIC GREENHOUSE

[76] Inventors: Glenn E. Inslee, P.O. Box 294, Fittstown, Okla. 74824; Donald W. Inslee, Rt. 1, Box 220-C, Roff, Okla. 74865; Theophilus D. Inslee, 601 W. 17th, Ada, Okla. 74820; Phillip D. Inslee, P.O. Box 96, Connerville, Okla. 74836

[21] Appl. No.: 196,364

[22] Filed: May 19, 1988

[51] Int. Cl.⁵ .............................................. A01K 63/04
[52] U.S. Cl. ........................................ 119/3; 210/169
[58] Field of Search ...................... 119/3; 47/62, 65; 210/169

[56] References Cited

U.S. PATENT DOCUMENTS

| | | | |
|---|---|---|---|
| 3,661,262 | 5/1972 | Sanders | 210/169 |
| 3,741,158 | 6/1973 | Moe, Jr. et al. | 119/3 |
| 3,757,739 | 9/1973 | Whitener | 119/5 |
| 3,842,804 | 10/1974 | Christensen et al. | 119/3 |
| 3,969,446 | 7/1976 | Franklin | 261/87 |
| 3,973,519 | 8/1976 | McCarty et al. | 119/3 |
| 4,002,566 | 7/1977 | Smith | 210/169 |
| 4,003,337 | 1/1977 | Moore | 119/3 |
| 4,034,030 | 7/1977 | Bracey | 261/64 |
| 4,077,158 | 3/1978 | England | 47/59 |
| 4,817,561 | 4/1989 | Byrne et al. | 210/169 X |
| 4,951,606 | 8/1990 | Hartung | 119/3 |

FOREIGN PATENT DOCUMENTS

| | | | |
|---|---|---|---|
| 240327 | 10/1986 | German Democratic Rep. | 47/62 |
| 8501715 | 1/1987 | Netherlands | 47/62 |
| 789082 | 12/1980 | U.S.S.R. | 119/3 |
| 1149906 | 4/1985 | U.S.S.R. | 119/3 |

OTHER PUBLICATIONS

L. Naegel, "Combined Production of Fish and Plants in Recirculating Water", Aquaculture, 10:17-24 (1977).
C. McCord et al., "Removal and Utilization of Nutrients by Chinese Water Chestnut in Catfish Ponds", Aquaculture, 13:143-155 (1978).
W. Lewis et al., "Use of Hydroponics to Maintain Quality of Recirculated Water in a Fish Culture System", Tr. Am. Fish Soc., 107:92-99 (1978).
C. Boyd et al., "Emergency Aeration of Fish Ponds", Tr. Am. Fish. Sock., 108: 299-306 (1979).
W. Hollerman et al., "Nightly Aeration to Increase Production of Channel Catfish", Tr. Am. Fish. Soc., 109:446-452 (1980).
R. Sutton et al., "Further Observations on a Fish Production System that Incorporates Hydroponically Grown Plants", The Progressive Fish-Culturist, 44:55-59 (Jan. 1982).
R. Zweig, "An Integrated Fish Culture Hydroponic Vegetable Production System", Aquaculture Magazine, May/Jun. 1986.
Materials distributed at Ann. Conven. Texas Fish Farmers and 1987 Fish Farming Conf., Jan. 28-29, 1987.
Sep. 1987 issue of the Catfish Journal, pp. 1, 5, 6, 8, 11-14.

*Primary Examiner*—Robert P. Swiatek
*Attorney, Agent, or Firm*—Mary M. Lee

[57] ABSTRACT

Combined fish farm and hydroponic network. The fish farm and hydroponic network are interdependent and operate on a constant body of water which is continuously circulated from the fish tank to the hydroponic network and back to the fish tank. The fish produce nitrogenous wastes which provide a constant source of nutrients for the plants. By removing the nitrogenous wastes, the plants serve as a filter to recycle the water for the fish. The fish tank also is equipped with a submerged biofilter with vertical channels and underlying air lines. Air bubbles rising through the channels produce a rolling current in the tank which agitates and aerates the tank water and at the same time provides oxygen to the organisms on the biofilter. The fish tank is enclosed in an insulated fish house to provide a self-heating fish farm which produces fresh fish year round. Likewise, the hydroponic network is enclosed in a greenhouse and provides a year round supply of organically grown fruits and vegetables.

18 Claims, 9 Drawing Sheets

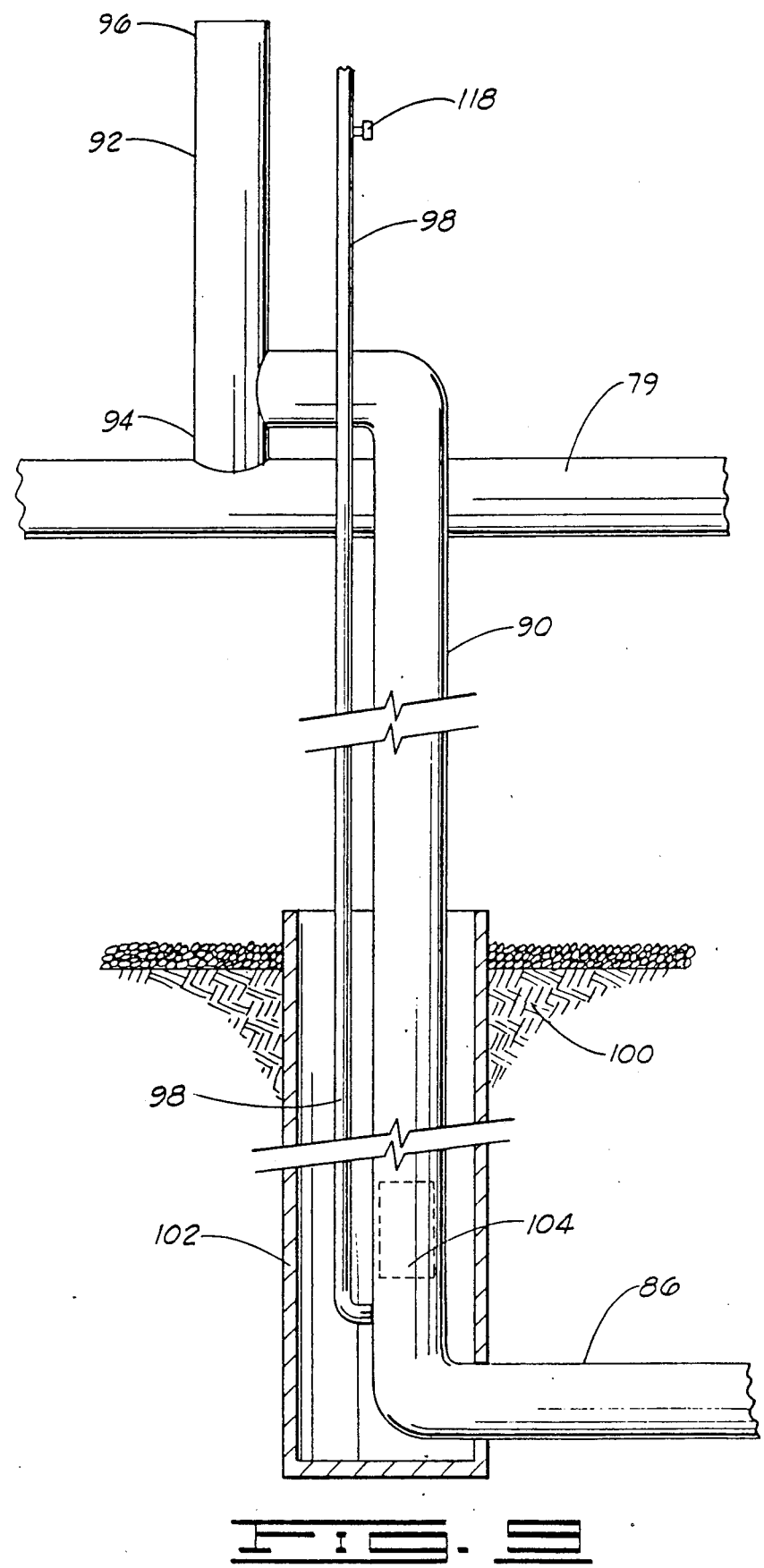

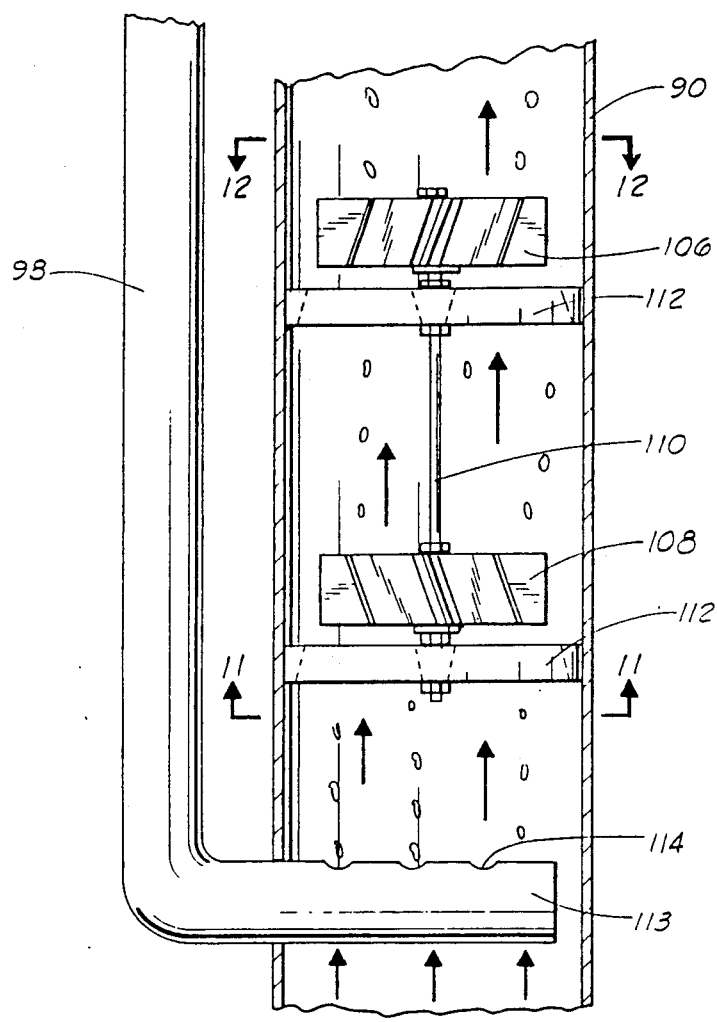
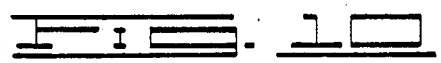
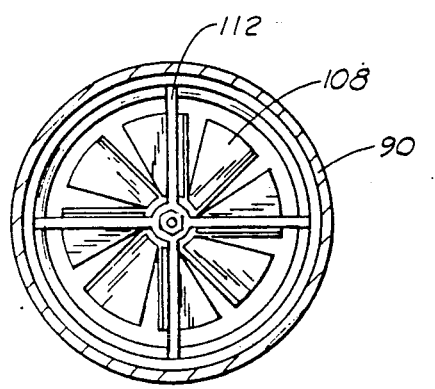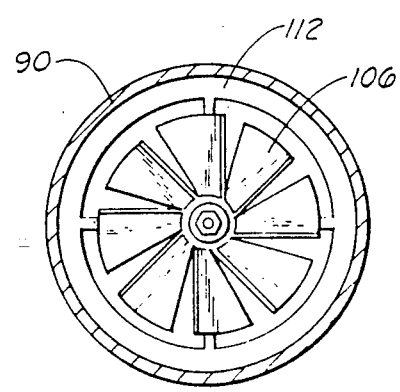
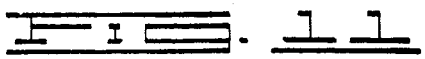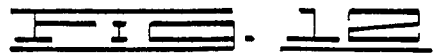

FISH FARM AND HYDROPONIC GREENHOUSE

FIELD OF THE INVENTION

The present invention generally relates to fish farms and, more particularly, to fish farms combined with hydroponic greenhouses.

SUMMARY OF THE INVENTION

The present invention comprises a fish tank assembly. The assembly includes a fish tank adapted for containing water and fish therein. One or more air lines are positioned on the bottom of the fish tank and are adapted for receiving air and for releasing the air in a column of rising bubbles. A biofilter is positioned in the tank so that when the tank is filled with water the biofilter will be submerged. The biofilter is characterized by a surface adapted for supporting microorganisms, and the surface is at least partly defined by a plurality of vertical channels which, when the tank is filled, will be above the air lines.

The present invention further comprises an indoor fish farm. A fish tank assembly, summarized above, is housed in an enclosure. Means is provided for maintaining nitrate in the fish water at or below selected levels.

Still further, the present invention is directed to a combined hydroponic network and fish farm. An enclosed fish tank is provided for containing a body of water and fish therein. The fish tank is in fluid communication with an enclosed hydroponic network. Means is provided for circulating water from the fish tank through the hydroponic network and back to the fish tank.

In accordance with the methods of the present invention, fish are grown by maintaining them in an enclosed fish tank and circulating the fish water from the fish tank through a hydroponic network and back to the fish tank. Plants may be grown in a hydroponic network by circulating a substantially constant body of water between the hydroponic network and a fish tank assembly in fluid communication with the hydroponic network. The fish tank assembly used in this method comprises an enclosed fish tank adapted for containing a portion of the body of water and fish therein. A biofilter submerged in the fish tank supports microorganisms capable of converting ammonia to nitrite and nitrite to nitrate, and means is included in the assembly for simultaneously aerating the water in the fish tank and circulating the water in the fish tank through the biofilter.

BRIEF DESCRIPTION OF THE FIGURES

FIG. 6 is a fragmented top plan view of the biofilter cage and underlying air lines of the fish tank.

FIG. 9 is a fragmented side elevational view of the water circulation system at the section where the water is elevated by a pump shown in phantom lines from below the ground to a position above the ground for gravity drainage through the hydroponic network.

FIG. 10 is a fragmented sectional view showing in detail the pump indicated by phantom lines in FIG. 9.

FIG. 11 is a cross-sectional view taken at line 11—11 of FIG. 10.

FIG. 12 is a cross-sectional view taken at line 12—12 of FIG. 10.

DETAILED DESCRIPTION OF THE PREFERRED EMBODIMENT

Figure 1:
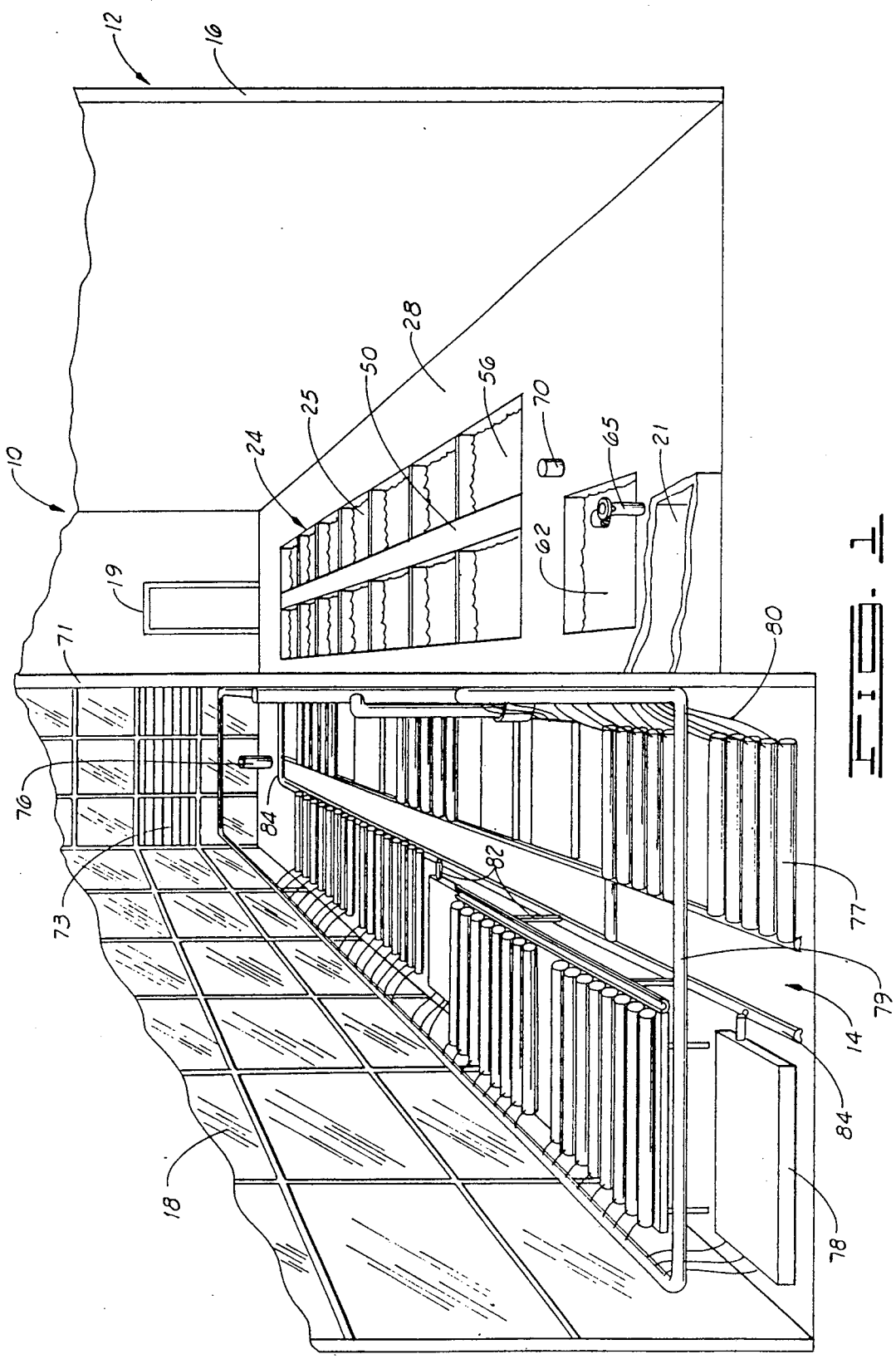
FIG. 1 is a frontal perspective view of a combined indoor fish farm and hydroponic greenhouse constructed in accordance with the present invention. The front wall of the structure is not shown.

The present invention, in its preferred embodiment shown in FIG. 1, comprises a structure, designated generally by the reference numeral 10, which houses a fish farm 12 and a hydroponic network 14. The fish farm 12 is enclosed in a fish house 16, and the hydroponic network is enclosed in a greenhouse 18.

The fish farm is adapted for growing any of a wide variety of aquatic life, referred to herein simply as fish, and most preferably a popular freshwater food fish, such as catfish or bass. The hydroponic network is adapted for growing plant life, and most preferably plants which produce herbs, fruits and vegetables.

In the preferred embodiment, which will be described in more detail below, water is circulated continuously from the fish tank through the hydroponic network and back to the fish tank. The products produced by the metabolism of the fish, particularly nitrogenous wastes, such as ammonia, nitrate and nitrite, are toxic to the fish but are nutritious for plants. As fish water passes through the hydroponic network, the fish wastes are removed by the plant roots. Thus, the hydroponic network maintains the fish water in a habitable condition for the fish, and the fish simultaneously provide a constant supply of nutrient-rich water for the plants in the hydroponic network.

The Fish House

As shown in FIG. 1, the fish farm of the present invention is housed in an enclosure, such as the fish house 16. A portable building or prefabricated structure serves very well for this purpose. The enclosure preferably is adapted for excluding sunlight and maintaining a relatively constant temperature for the fish farm. To this end, insulation, preferably spray-on styrene insulation about two inches thick, may be applied. While sunlight preferably is totally excluded, a system of incandescent lighting usually is installed for occasional use by the operators. These features are of a conventional nature and are not depicted in the drawings. For convenience, several doors 19 may be included. For loading and unloading, a large overhead door 20 is desirable. These doors are of conventional construction and are indicated only diagramatically.

The fish house 16 preferably includes a small room or closet 21 for housing the air blowers, described below, so that the source of air to the blowers may be controlled. A window 22 may be provided in the blower closet for providing air directly from outside. It is also advantageous to provide an underground air line 23, indicated by dotted lines, which opens into the blower closet.

The, underground line 23 preferably is about twelve inches in diameter and extends a distance of about 500 feet underground before it opens to the outside. It should be buried at least five feet under the surface. In this way, the temperature of the air traveling through the underground line will equilibrate to the temperature of the surrounding earth. This provides an easy and economical way of heating and cooling the air used to aerate into the fish tank and holding tank.

The Fish Tank

The fish farm 12 preferably comprises a fish tank assembly 24 comprising a fish tank 25 adapted for containing a body of water and a population of fish therein. The tank may be formed of any suitable material and may be above or below ground. However, in the preferred embodiment (FIG. 1) the tank is formed in a body of concrete 26, the upper surface of which defines the floor 28 of the fish house 16.

Figure 2:
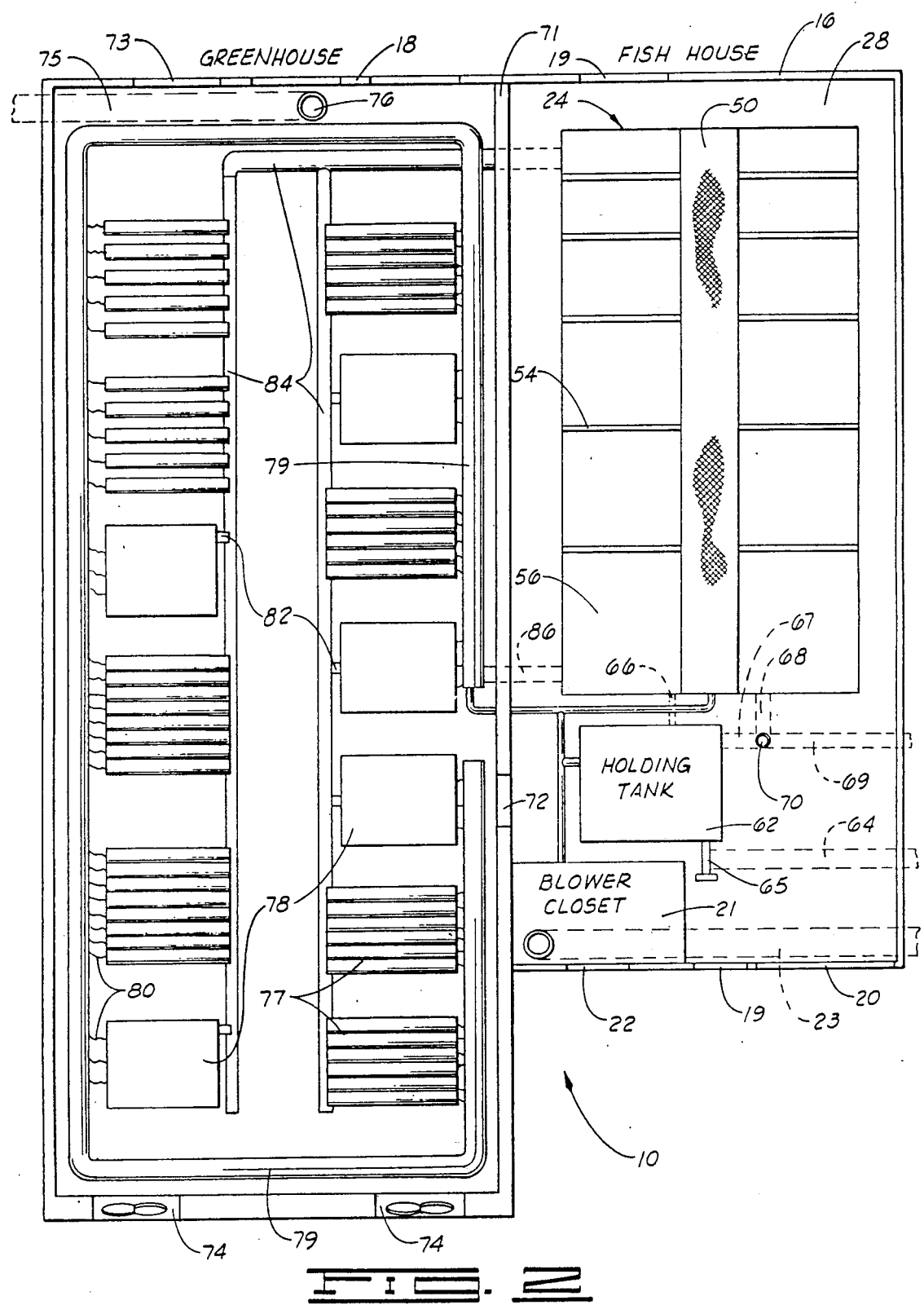
FIG. 2 is a top plan view of a combined hydroponic greenhouse and fish farm constructed in accordance with the present invention.
Figure 4:
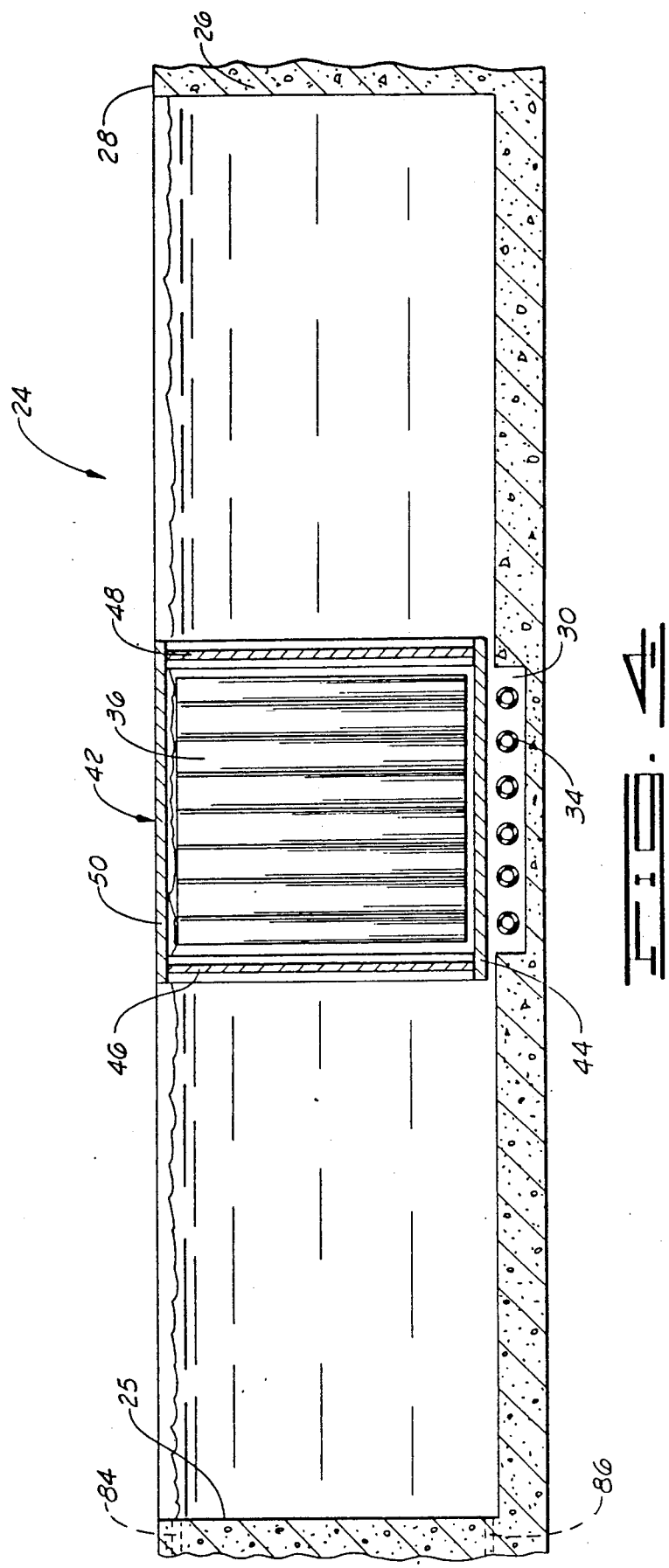
FIG. 4 is a cross-sectional view of a fish tank assembly constructed in accordance with the present invention.

The preferred shape of the tank 25, best seen in FIGS. 2 and 4, is generally rectangular, although neither the overall shape nor size of the tank alone is critical to the operation of the fish farm. A convenient size is about 20 feet wide by about 40 feet long by about 5 feet deep. This tank will hold about 27,000 gallons or about 3600 cubic feet of water.

For a purpose to be described hereafter, a trough 30, shown in FIG. 4, preferably is provided lengthwise in the bottom of the tank along a line which divides the tank longitudinally into about two equal sections. Vertical recesses 32, best shown in FIG. 7, may be formed in the sides of the tank for supporting dividers, also described below.

Figure 5:
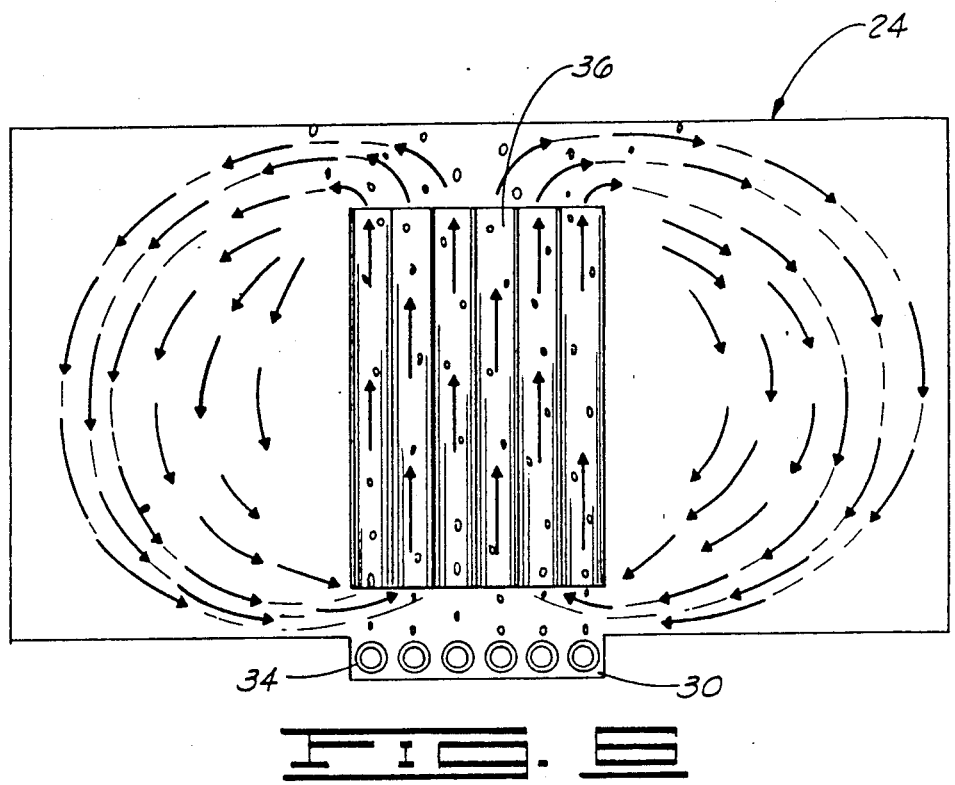
FIG. 5 is a semi-schematic drawing showing the rolling current produced by the rising air bubbles and the channelled biofilter of the fish tank assembly of the present invention.
Figure 5:
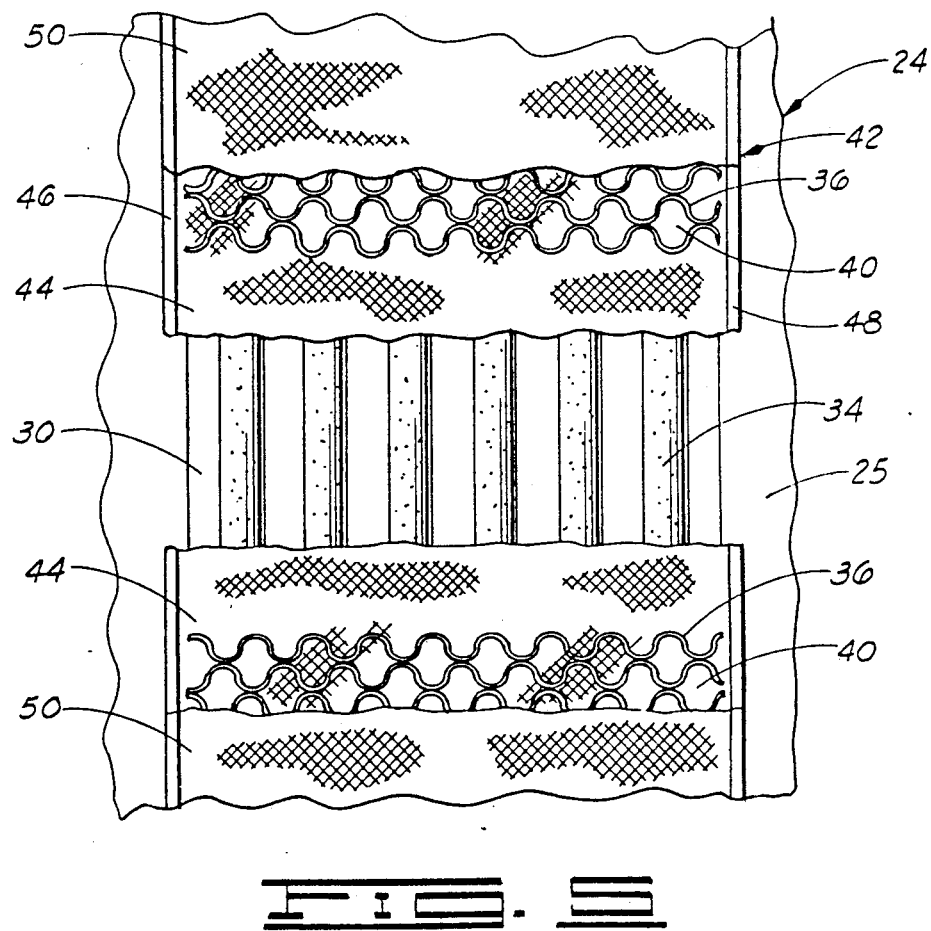

As best seen in FIGS. 4 and 5, one or more, and preferably six, air lines 34 are positioned lengthwise in the trough 30 along the bottom of the tank 25. The air lines 34 are connected to an air supply, described below. Each air line is adapted, such as by perforation, for releasing air bubbles along substantially its entire length. Thus, when air is fed through these lines there is generated a column of rising air bubbles in the water about as wide as the trough 30, best shown in FIG. 6. Preferred air lines consist of the porous rubber "leak lines" used commonly for watering or irrigation purposes. These leak lines usually are made of reprocessed automobile tires and are widely available and inexpensive.

Referring still to FIGS. 4 through 6, a biofilter 36 is positioned in the tank preferably directly above the air lines 34, and about twelve inches above the bottom of the tank 25. The biofilter is characterized by a surface adapted for supporting microorganisms. For purposes of the present invention, a biofilter defined by a plurality of vertical channels is preferred. It should be noted that the configuration of the channels, or their shape in cross section, may vary. In the embodiment described herein, the channels are roughly elliptical in cross section. However, any shape of channel is suitable which provides a large surface area yet does not impede the upward flow of water through the biofilter.

A suitable biofilter may be constructed easily and inexpensively of sheets of corrugated fiberglass. Specifically, sheets of this material are cut so as to have a width of about the same width as the trough 30 so that air from the underlying air lines 34 will rise up through substantially all the columns. The height of the biofilter preferably is slightly less than the depth of the tank 25 so that when the tank is filled, the biofilter will be completely submerged.

In the embodiment shown in the drawings, about 720 fiberglass sheets 38 are cut to about 44 inches tall by about 30 inches wide. As best seen in FIG. 5, the fiberglass sheets are positioned in a back-to-back arrangement so that vertical channels 40 are created between the sheets. The sheets may be attached, such as by gluing, at points of contact. A biofilter of this construction which is about 36 feet long (slightly less than the length of the tank) will have a volume of about 330 cubic feet and a surface area of about 50 square feet per cubic foot.

For retaining the biofilter in its position over the trough 30, a cage 42 may be provided, as seen in FIGS. 4 and 5. The cage 42 preferably comprises a bottom 44 and sides 46 and 48 of wire screen or mesh, preferably vinyl coated. The spaces in the screen should be large enough so that the screen does not significantly impede currents of water from passing therethrough, yet small enough so that the smallest fingerlings cannot slip through to the inside of the cage 42. An acceptable wire screen has holes about one-half inch by one inch.

The top 50 of the cage 42 preferably is constructed of sturdy expanded metal which is positioned so as to be about flush with the floor 28 of the fish house 16, as shown in FIG. 1. In this way, the top 50 of the cage can serve as a walkway over the center of the tank 25. It is also convenient to construct the top 50 in detachable sections so that one section may be lifted by a person standing on an adjacent section. Thus, the underlying sections of the biofilter 36 may be easily accessed if necessary.

Now it will be appreciated that the sides 46 and 48 of the cage which support the top 50 will preferably be of sturdy construction so that the top 50 can support several people. For supporting the dividers described later, the sides 46 and 48 of the cage 42 preferably are provided with vertical recesses 52, shown in FIG. 7, opposite the vertical recesses 32 in the tank sides.

Turning now to FIG. 2, the fish tank assembly 24 preferably further comprises at least one divider 54 for dividing the tank into a plurality of linearly arranged compartments, only one of which is designated by the reference numeral 45 in the figures. The compartments 56, of which there are preferably six on each side of the biofilter cage 42, are of graduated sizes or volumes. Thus, as indicated diagramatically in FIG. 3, each compartment can be used to contain a population of fish being of about equal size, and the compartments of different sizes will segregate groups of fish of different sizes. Other advantages of this arrangement are described below.

Figure 8:
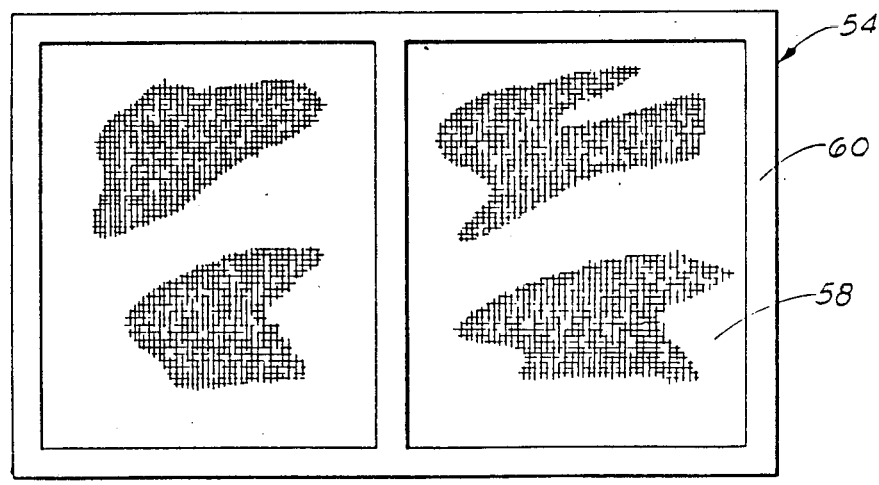
FIG. 8 is a front elevational view of one of the dividers made in accordance with the present invention.

The dividers 54, one of which is shown in FIG. 8, may be constructed in any suitable manner. The preferred divider will comprise screen or mesh panels 58 supported by a lightweight frame 60 made of wood, aluminum or the like. The mesh of the panels 58, like the sides 46 and 48 of the biofilter cage 42, preferably is large enough to permit free flow of water through the panels, but small enough to prevent the fish from moving through the panels.

Figure 7:
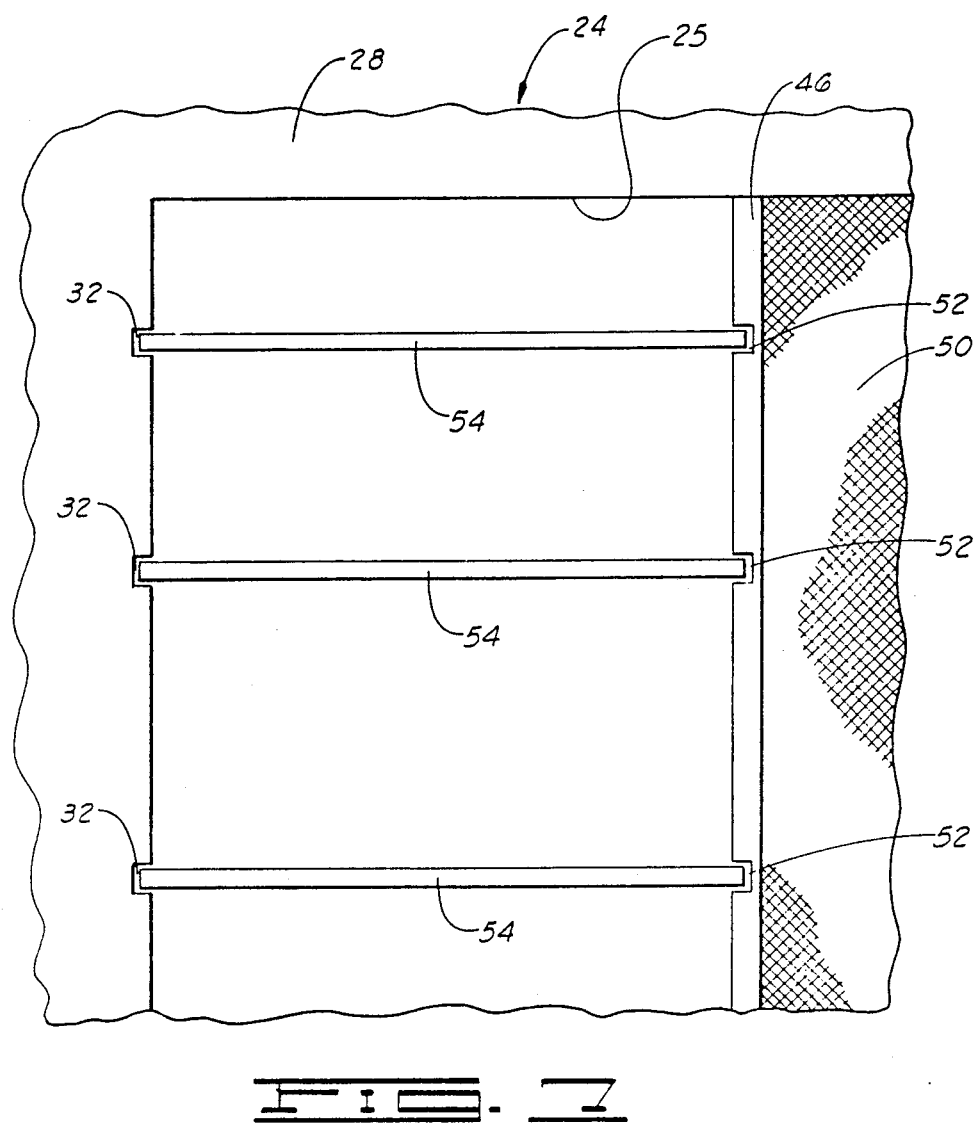
FIG. 7 is a fragmented top plan view of the fish tank of the present invention.

The dividers 54 preferably are constructed so that they can be easily and quickly removed and replaced. As best seen in FIG. 7, the frame 60 of the dividers 54 may be sized so as to be slidably receivable within one of the vertical recesses 32 in the side of the tank 25 and its opposing vertical recess 52 in the side 46 of the cage 42. Thus, a person standing on the floor 28 of the fish house or on the top 50 of the cage 42 can easily move the divider 54 in and out of the tank 25.

The Holding Tank

As shown in FIGS. 1 and 2, in addition to a fish tank assembly, the fish farm 12 also preferably comprises a holding tank 62. The holding tank preferably has a volume about equal to one of the largest compartments 56 as it is used to harvest the fully grown fish population.

The holding tank 62 preferably is formed in the body of concrete 26 forming the floor 28 of the fish house 16 and for convenience in harvesting is located adjacent the largest compartments 56 of the fish tank. It is preferred that the holding tank be provided with a small biofilter and underlying air line system similar in construction to the biofilter 36 and air lines 34 of the fish tank assembly 24.

Suitable harvesting cages and transfer mechanisms are preferably provided for convenient movement of fish from the fish tank 25 to the holding tank 62, and from the holding tank to a delivery container or vehicle. These are of known construction and are not shown in the drawings.

Water Supply and Drainage

Figure 3:
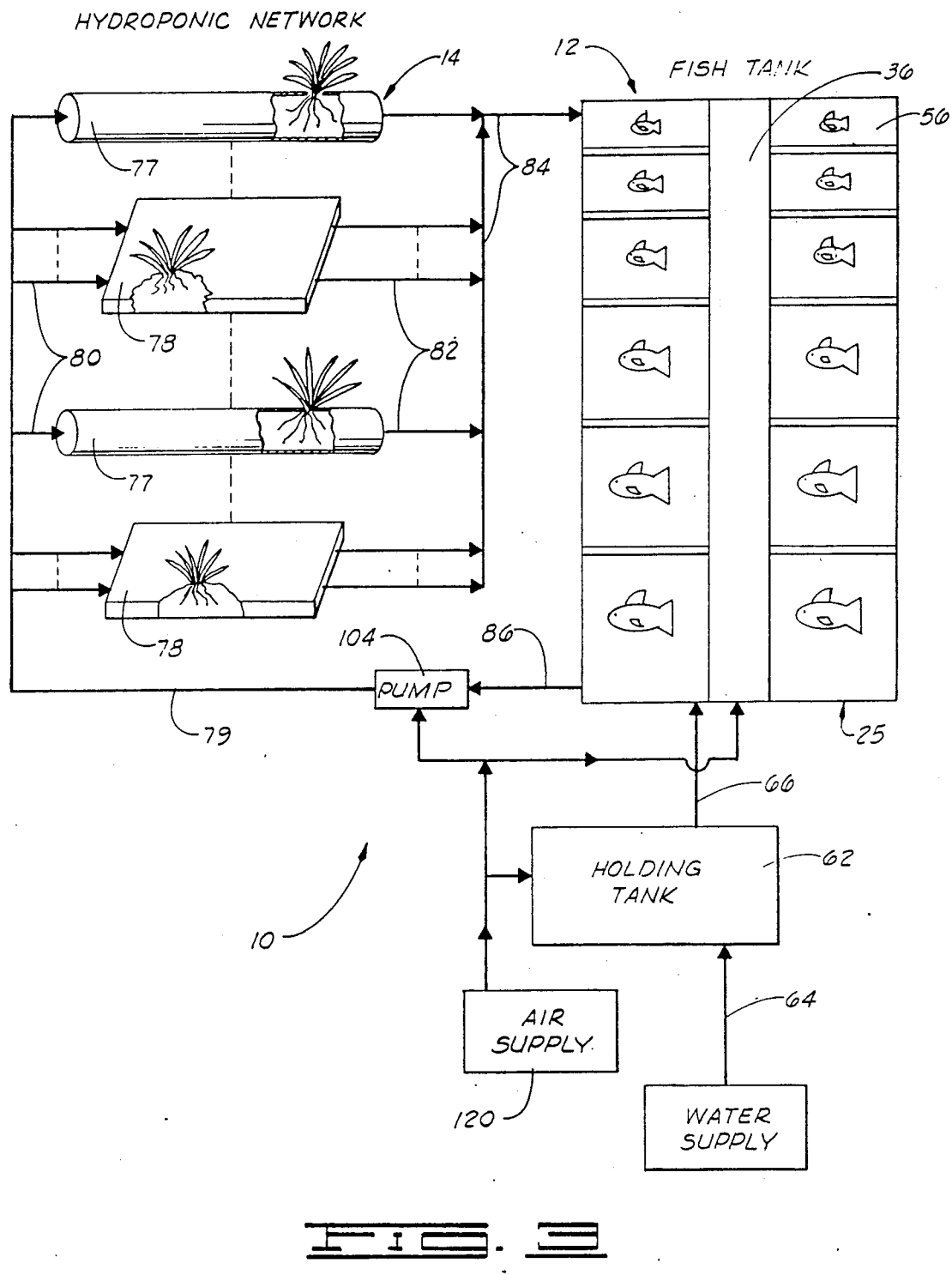
FIG. 3 is a schematic drawing of the components of a combined fish farm and hydroponic network constructed in accordance with the present invention.

The fish farm 12 further preferably comprises a conduit 64 which connects the fish farm to a water supply, as indicated in the diagram of FIG. 3. It will be understood that the type of water used in the fish tank will vary according to the species of fish to be grown. Where freshwater fish, such as bass or catfish are to be grown, well water is preferred as it will have a relatively constant temperature and quality, and no harmful pathogens. However, water from other sources, such as a nearby pond, is acceptable.

In this instance, the conduit 64 which preferably is underground, will be connected to a nearby well or pond or other water supply. The conduit 64 provides fluid communication between the water supply and the fish farm in any suitable arrangement. In the preferred arrangement shown in FIGS. 1, 2 and 3, the underground conduit 64 connects to a faucet 65 which directs the water from the water supply into the holding tank 62.

Another conduit 66 is provided between the holding tank 62 and the fish tank 25, and this conduit preferably is positioned immediately under floor level or at about the desired water level. In this way, if the water in the holding tank 62 is low, water can be added from the faucet 65 without disturbing the water in the fish tank 25. If the water level in the fish tank 25 is low, water is added to the holding tank 62 until the desired amount of water has spilled over into the fish tank.

The fish farm 12 may be provided with a drainage line, siphoning systems or such, for draining the fish tank and holding tank if this should become necessary. In the preferred embodiment, tank drainage lines 67 and 68 from the holding tank 62 and the fish tank 25 connect with a main drainage line 69 which empties at an appropriate place outside, such as into a nearby lake or pond. A stop pipe 70, or some other form of valve, is provided to open and close the main drainage line 69.

The Greenhouse

The biofilter in the fish tank supports microorganisms which convert ammonia to nitrite and nitrite to nitrate. Although nitrate is the least toxic of the nitrogenous wastes produced by the fish, it is toxic if allowed to accumulate. Accordingly, another filter or mechanism of some sort should be included for maintaining nitrate at or below selected levels. In the present invention, water preferably is circulated from the fish tank through a hydroponic network, and the plants in the hydroponic network remove the nitrate and other fish waste products and use them as nutrients.

As depicted in FIGS. 1 and 2, the hydroponic network 14 preferably is housed in an adjacent greenhouse 18 which forms a part of the overall structure 10. The greenhouse portion 18 of the structure 10 preferably shares a side wall 71 with the fish house 16 and may be provided with a door 72, as indicated in FIG. 2, for access between the fish house 16 and the greenhouse 18. The remaining three walls and roof of the greenhouse 18 preferably will be constructed of a strong transparent or translucent material, such as glass, plexiglass, or plastic sheeting, as shown in FIG. 1.

For climate control, adjustable air inlet windows 73 may be provided along with exhaust fans 74 typically on an opposite wall from the air inlet windows. It is also advantageous to include an underground air line 75 shown by dotted lines with an opening 76 into the greenhouse. This pipeline, like the underground line 23 for the blower closet 21, is about 500 feet long. and is buried at least five feet underground. This underground line provides an inexpensive way of heating or cooling incoming air. However, in very cold weather, additional heaters (not shown) may be needed. Similarly, on very hot days a cooling apparatus, such as an evaporative cooler (not shown), may be required.

The Hydroponic Network

With continuing reference to FIGS. 1 and 2, the hydroponic network preferably comprises a plurality of plastic pipes 77 of various sizes and styrofoam flat beds 78, for supporting a crop of plants of various sizes and types. The plant volume or root mass in the hydroponic network should be determined according to the total volume of fish water which is to be filtered and the number and size of the fish being grown. It is preferable to provide a hydroponic network of a size which will be capable of cycling water at the rate of one tank volume per day. For a fish tank of the dimensions described herein, about 15,000 square feet (floor area) of hydroponics will be needed.

In the preferred arrangement, there is an incoming water line 79 which channels the water to the pipes 77 and beds 78 through individual feed lines 80. Water leaving the pipes 77 and beds 78 is received in collecting lines 82 and channeled to a return line 84.

As shown in FIG. 2, the fish tank 25 is in fluid communication with the hydroponic network. In the preferred construction an underground connecting pipe 86, about four inches in diameter, connects the fish tank 25 to the hydroponic network 14. A pump assembly may be used to elevate the fish water from the connecting pipe 86 to a position slightly above the incoming line 79 in the greenhouse. From this position, gravity will provide a gentle yet constant force for moving the fish water through the hydroponic network 14.

Because most of the fish waste products, especially solid wastes, settle near the bottom of the fish tank 25, it is best to position the connecting pipe 86 at about the level of the tank bottom, as shown in FIG. 4. On the other hand, the return line preferably is positioned just about water level so that returning water will flow down into the fish tank.

The Greenhouse Pump

FIGS. 9 and 10 depict a preferred pump assembly for lifting the fish water from the connecting pipe 86 underground to a position above the incoming water line 79 of the hydroponic network 14. It should be noted, however, that other pumps would operate satisfactorily.

A vertical pipe 90 extends upward a distance from underground to a point above the incoming water line 79 and curves to join a vertical air venting pipe 92. The bottom 94 of the vertical air venting pipe joins the incoming water line 79 and the top 96 of the air venting pipe is open and extends a distance above the point where the vertical pipe 90 joins it. Thus, in this arrangement, water may be pumped up the vertical pipe 90 so that it spills over into the overflow pipe 92 and down into the incoming water line 79. At this point, excess air in the incoming water is released from the top 96 of the air venting pipe 92.

Referring still to FIGS. 9 and 10, a descending air line 98, coming from the air supply system to be described later, extends downward alongside the vertical pipe 90 and joins the vertical pipe 90 near the bottom. The purpose of the descending air line 98 relates to the preferred pump apparatus, indicated by the dotted lines in FIG. 10, which is described below. The underground portions of the vertical pipe 90 and the accompanying air line 98 may be isolated from the surrounding earth 100 by a casing 102, such as a wide plastic pipe, metal conduit or the like.

The details of the preferred pump apparatus are shown in FIG. 10. This apparatus 104 preferably comprises at least a pair of turbines 106 and 108 having oppositely oriented blades. The turbines 106 and 108 are mounted for independent rotation on a vertical spindle 110. The apparatus 104 is mounted inside the vertical pipe 90 near the bottom and above the point where the descending air line 98 joins the vertical pipe 90. The spindle 110 preferably is mounted within the lumen of the vertical pipe 90 by one or more, and preferably two, collars 112. The collars 112 may be attached to the side walls of the vertical pipe 90, as shown.

As shown in FIG. 10, the descending air line 98 has a horizontal arm 113 that extends through the wall of the vertical pipe 90 and well into its lumen. The arm has several openings 114 positioned so that the air bubbles released therefrom will rise up through the pump apparatus 104.

In operation, the rising air bubbles released from the air line arms 113 create an upward current of water in the vertical pipe 90. Because of the configuration of the blades of the turbines 106 and 108, the upward flow causes the turbines to rotate. The rotation of the turbines adds another lifting force and increases the upward current in the water.

The rate of air flow through the descending air line 98 should be adjusted to a rate sufficiently high to create an upward current in the water which is sufficient to move the water up the entire distance of the vertical pipe 90, which is about nine feet. For adjusting the air flow, a flow valve 118 may be interposed at a convenient place in the descending air line 98.

The turbine assembly just described may be obtained from mat aerators marketed by Ramco Sales Inc. (San Pedro, Calif.). These mat aerators have the turbine assembly mounted inside a tube anchored over a weighted base. The turbine assembly of the mat aerator can be easily removed from the tube of the Ramco aerator and mounted inside the lower end of the vertical pipe 90.

The Air Supply System

As shown in FIG. 3, the present invention also preferably comprises an oxygen or air supply system. It will be understood that pure oxygen or a non-toxic gas comprising a sufficient concentration of oxygen could be used instead of air. However, air is the most abundant and least expensive source of oxygen presently available, and as such, is the preferred oxygen source. As used herein, "air" or "air supply" refers to any gas mixture containing sufficient amounts of oxygen.

The air supply system delivers air to the air lines 34 of the fish tank 25 and also to the air lines (not shown), if any, in the holding tank 62. The air supply system also preferably is used to drive the pump apparatus 104 which circulates the fish tank water through the hydroponic network, as described previously.

Figure 13:
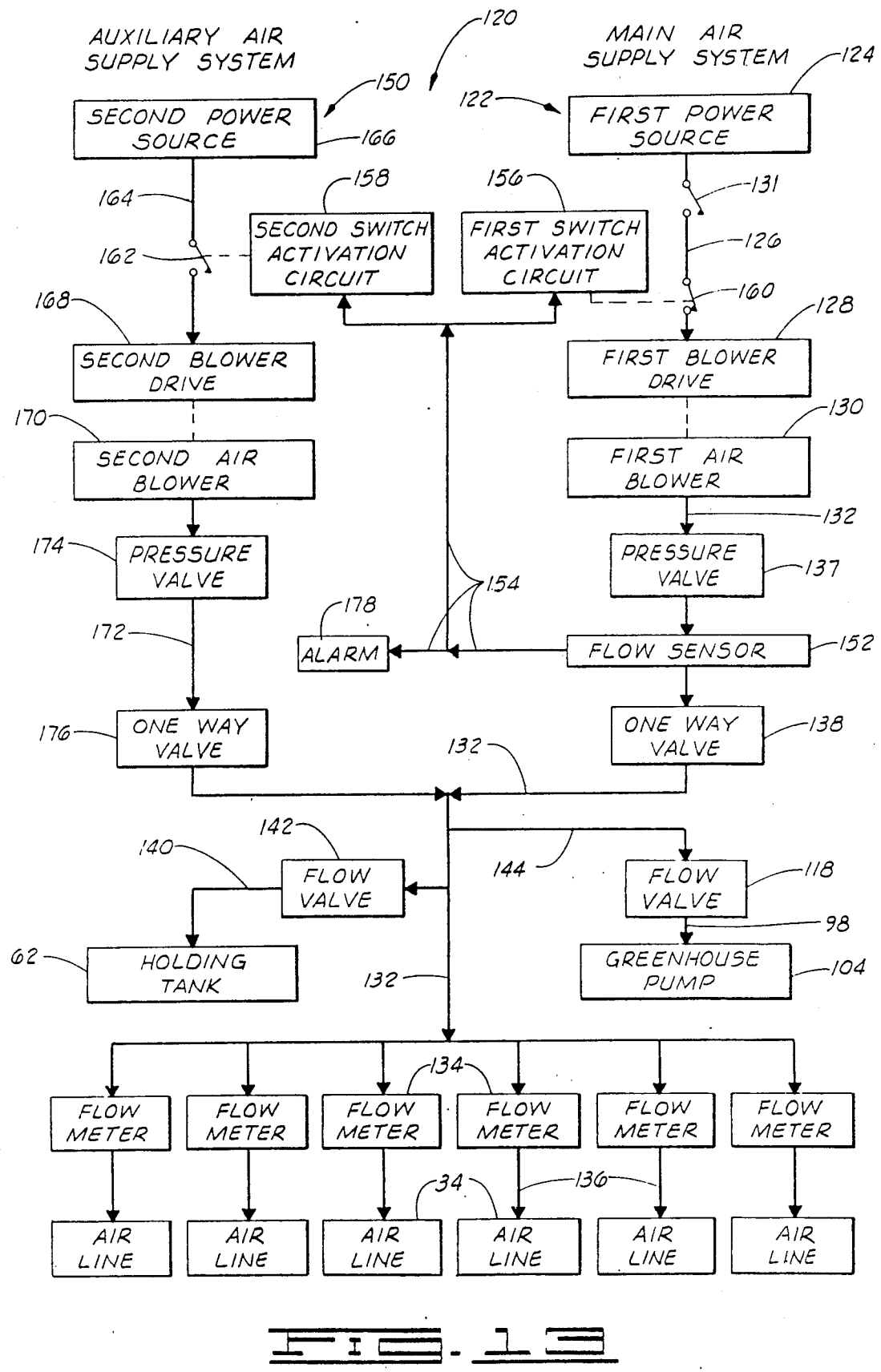
FIG. 13 is a schematic drawing of the air supply systems of the combined fish tank and hydroponic network shown in FIGS. 1–3.

A preferred air supply system is shown schematically in FIG. 13. This air supply system 120 for use in the present invention comprises a main air supply system 122 powered by a first power source 124, preferably AC current. The first power source 124 is connected by a signal path 126 to a first blower drive 128 which mechanically drives a first air blower 130 activated by a manual switch 131.

The preferred blower is of the high volume-low pressure type and driven by an electrically powered, direct drive motor having about a 5 horsepower capacity. The blower should be capable of producing compressed air at about 3 psi and at a constant rate of about 135 cfm. For the fish farm and hydroponic network described herein, one suitable blower is Model No. 3LT, Series F, marketed under the brand name Sutorbilt by Cooper Industries (Compton, Calif.).

The first air blower 132 conducts air through a main air conduit 132 to flow meters 134. The flow meters 134 meter the delivery of air to air line conduits 136, preferably piping, which are connected to the ends of the air lines 34 under the biofilter 36 in the fish tank 25.

A pressure or "pop-off" valve 137 is interposed in the main air conduit 132 for releasing pressure in the case of a blockage in the conduit 132 or some other malfunction. A one-way or "check" valve 138 is interposed in the main air conduit 132 to prevent backflow of air.

A second air conduit 140 branches off from the main air conduit 132 and conducts air to the air lines in the holding tank 62. A flow valve 142 is interposed in the second air conduit for regulating the flow of air to the holding tank 62. A third air conduit 144 is continuous with the descending air line 98 which conducts air to the greenhouse pump 104, as previously described. As mentioned previously, the flow valve 118 is interposed in the descending air line 98 for regulating the flow of air to the greenhouse pump 104.

It will now be appreciated that a sustained interruption of the air flow to the fish tank, holding tank and greenhouse pump would be detrimental to the fish, the organisms on the biofilter and the plants. To prevent such an interruption, an auxiliary air supply system 150 is included in the preferred embodiment. For sensing an interruption of air flow from the first air blower 130, a flow sensor 152 is interposed in the main air conduit 132. This sensor 152 can be of any suitable type, such as a magnetic flapper strip. If air flow through the conduit ceases or is greatly reduced, the flap closes and completes an electrical circuit through the sensor. The flow sensor 152 is connected by a signal path 154 to a first switch activation circuit 156 and a second switch activation circuit 158.

When the flow sensor 152 senses an interruption of air flow in the main air conduit 132, it outputs a signal which is transmitted along the signal path 154. Upon receiving this signal, the first switch activation circuit opens a switch 160, which is normally closed. This interrupts the signal path 126 and shuts off the first blower drive 128.

Upon receiving the signal from the signal path 154, the second switch activation circuit closes the switch 162 in the signal path 164, which is normally open. This completes the circuit between a second power source 166, such as an emergency generator, and a second blower drive 168 which drives a second air blower 170. Thus, the second blower is activated.

Air from the second air blower 170 is conducted by an auxiliary air conduit 172 which joins the main air conduit 132 at a point beyond the one-way valve 138. The auxiliary air conduit 172 also preferably is provided with a pressure valve 174 and a one-way valve 176.

To alert supervisory personnel of the activation of the auxiliary air supply system, an alarm 178 may be included in the air supply system. The alarm device may be any of several commercially available devices. For example, it may be a loud audible tone or bell device or a visible alarm light. The alarm device 178 may be activated by a signal on the signal path 154 so that it is activated simultaneously with the first and second switch activation circuits 156 and 158.

As indicated above, the fish house 16 is preferably provided with a blower closet 21. The first and second air blowers and blower drives, the emergency generator and the electrical circuitry comprised in the air supply system preferably are all contained in the blower closet 21.

Setup and Operation of the Systems

Having now constructed a fish farm in accordance with the present invention, preferably in combination with the hydroponic network as described, we turn now to start-up and operation of the systems. Typically, the fish farm will be set up prior to setting up plants in the hydroponic network.

First, the species of fish to be grown is selected. As indicated previously, virtually any species of aquatic life may be grown in this fish farm.

Next, the biofilters in the fish tank and holding tank are populated with microorganisms capable of converting ammonia to nitrite and nitrite to nitrate. This will occur naturally, where pond water is used, but it may require as long as several weeks for a sufficient population to accumulate. Prepared cultures of microorganisms for seeding the biofilters are commercially available and will significantly reduce the time required to adequately populate the biofilters, and possibly to only a few days. The biofilters are adequately populated when the ammonia concentration decreases and the nitrate level increases.

Prior to introducing fish into the fish tank, the air supply system is activated to begin aeration and agitation of the fish water. The first air blower is turned on and the flow rates to the air lines in the fish tank are adjusted. The flow rate to each of the six air lines in the fish tank, if constructed as described herein, preferably will be about 15 CFM for a total of about 90 CFM. But, again, this may require adjustment for a tank of different dimensions.

With reference again to FIG. 6, the air flow to the fish tank should be adjusted so that a sufficient upward lift is generated to produce a current on each side of the biofilter 36 substantially as shown. This current preferably extends substantially across the width and depth of each section of the tank. Most preferably, the current will extend from top to bottom and across the entire width of the tank. The flow should be sufficient to circulate the volume of water on each side of the biofilter through the biofilter about every two minutes. Thus, it will be understood that the width and depth of the tank, the dimensions and position of the column of air bubbles and the upward current produced thereby, must be relatively sized to produce a rolling current of the desired dimensions.

Now the advantages of the submerged biofilter and the underlying air lines will be appreciated. A single air source simultaneously serves three important functions. The air released at the bottom of the tank and rising up through the channelled biofilter provides an ample source of needed oxygen to the microorganisms on the biofilter. This rising air column sets in motion a continuous churning or rolling current which agitates the water throughout the tank. The air bubbles carried with the current are dispersed throughout the tank water thus maintaining a high dissolved oxygen content in the water throughout the tank.

Aeration and agitation of the holding tank may be adjusted as in the fish tank assembly. Because the preferred holding tank is much smaller than the fish tank and has only a one-side arrangement, less air will be required to generate a sufficiently sized current. An acceptable flow rate for the holding tank described herein is about 20 CFM, but this may vary according to the dimensions of the tank.

Having activated the aeration and agitation system and populated the biofilter, the fish tank 25 now is ready to receive fish. Preferably, a population of fingerlings is introduced into the smallest compartments, as shown in FIG. 2. The maximum number of fish that can be put in a compartment will vary according to the size of the compartment or, more specifically, the volume of water in the compartment. This can be determined by known principles. Generally, about 2.7 to about 10 pounds of fish per cubic foot of water will be appropriate.

An optimum growth period, which is the optimum length of time a population of fish should remain in a compartment, should be determined for the selected species. This is based on known principles and will vary with the species of fish. For example, 28 days is a suitable growth period for channel catfish.

After the first growth period, the divider is removed and the batch of fish is herded into the next compartment. After the dividers are replaced, a new batch of fingerlings is introduced into the smallest compartment. In like manner, at the end of each growth period, the batch of fish in each compartment is advanced into the next largest compartment and a new batch of fingerlings is introduced into the first compartment.

The fish in the fish tank preferably are fed a commercially prepared diet, such as Cole 36 Percent Protein Cage Ration (Muskogee, Okla.). The diet should be given according to the manufacturer's directions.

In a tank having six sizes of compartments, as shown herein, a batch of fully grown fish will be ready for harvesting from the largest or last tank after six growth periods. At this time, the batch in the largest compartments is harvested and transferred to the holding tank.

The harvested fish are maintained without feeding in the holding tank 62 until their alimentary systems are emptied, preferably about 7–14 days. This eliminates undesirable flavor and odor from the fish. After this period, the fish are ready for market.

Thus, the total time in the fish tank for each batch of fish is about six months. Yet, a fresh batch of fully grown catfish is produced once a month in a production-line fashion.

The temperature of the fish water should be maintained at an optimum level for the species of fish involved. For catfish, the optimum water temperature is about 80°–82° F.

The temperature of the air in the fish house should be maintained at a selected level as this has a large effect on the water temperature. The optimum room temperature for the fish house will depend on the species of fish. For catfish, for example, an optimum room temperature is about 80° F.

The temperature of the air used to aerate the fish water also has a direct effect on the water temperature. Accordingly, the temperature of the air supply to the air blowers may be adjusted as needed. For example, when the outside air is too hot or too cold, the window 22 in the blower closet 21 may be closed and the opening to the underground line 23 opened. Also, as the temperature of air increases when it is compressed, the degree of compression on the blower may be adjusted. For cooler air, the pressure is decreased, and for warmer air the pressure is increased.

The metabolic processes of the fish and of the microorganisms in the biofilter give off heat. So does the natural oxidation of the solid waste products produced by the fish. Thus, in cool weather, these factors in combination with the compressed air supply, usually will be sufficient to maintain room temperature in the fish house if it is well insulated. In warm weather, the doors may be opened as necessary to allow a cross-draft.

As the population of fish in the fish tank is increased, the plant volume in the hydroponic network likewise is gradually increased. Preferably, a variety of plants in varying growth stages are maintained.

The flow of incoming water to the hydroponic network should be regulated so that a unit of water is circulated through the system about every 24 hours. In the embodiment shown, an adequate flow rate is about 18–35 gallons per minute.

The flow rate in most instances will be regulated by adjusting the greenhouse pump. In the preferred embodiment, as previously described, the circulation rate is a function of the flow of air through the third air conduit 144 and descending air line 98. Thus, the flow valve 118 is used to regulate the air flow to the pump 104 and the circulation of fish water through the hydroponic network.

The composition of the circulating water should be monitored regularly. Adjustments should be made as necessary to ensure that the water contains the necessary nutrients for the plants and that the nitrogenous wastes are being maintained at or below a non-toxic level for the fish.

The water should be tested for plant-required nutrients, such as phosphorous, calcium, potassium and others. The water may be enriched if necessary, but only with substances that are compatible with the tolerances and requirements of the fish, the plants and the organisms on the biofilter. Preferably, relatively constant levels of these substances will be maintained to assure even and predictable plant growth.

In this regard it should be noted that no pesticides of any kind should be used on the plants. These substances are transmitted by the roots into the effluent water and could prove toxic to the fish and bacteria. Thus, the plants grown in accordance with the present invention are completely organic.

The ammonia concentration should be monitored regularly, preferably about every day. It should be maintained at less than 0.4 parts per million, and more preferably at less than 0.2 parts per million. The nitrate and nitrite concentrations each should be maintained below about 200–300 parts per million.

If the ammonia or nitrite levels are too high, the surface area of the populated biofilter may be increased. The increased number of bacteria will improve the conversion of ammonia to nitrite and of nitrite to nitrate. If the concentration of nitrate is too high, the volume or root mass of plants in the hydroponic network should be increased.

The concentration of dissolved oxygen in the fish water should be tested regularly, preferably at least twice a day. The oxygen concentration should be at least three parts oxygen per million parts water, and preferably higher. If the water contains too little oxygen, the flow rate to the air lines under the biofilter should be increased. In some instances, it may be beneficial to install other aeration and agitation equipment. It might also be feasible to enrich the air supply with pure oxygen to increase the concentration of oxygen in the air supplied to the fish tank.

The pH of the fish water should be monitored regularly, about every day, and adjusted if necessary to maintain a pH between 6.5 and 8.5, and preferably about 7.0. If the pH is low, lime or some other non-toxic, water soluble alkaline substance should be added. If the pH is too high, hydrochloric acid or some other acid compatible with fish and plant life and the biofilter organisms should be added.

The solid fish waste may accumulate in the pipes and beds of the hydroponic network. This can be removed periodically, as needed.

The total volume of water in the system should be monitored, preferably by observing the water level in the fish tank or holding tank. However, it will be appreciated that, because of the symbiotic relationship between the hydroponic network and the fish farm, the system operates on a substantially constant body of water. There is no need to replace portions of the fish water in order to maintain nitrogenous wastes at non-toxic levels. When the described systems are operating efficiently, the only additional water required will be the relatively small amount needed to replace water lost by evaporation and plant transpiration.

In accordance with the methods of the present invention, fish may be grown by maintaining them, as described, in the enclosed fish tank. The water from the fish tank is circulated through the hydroponic network and back to the fish tank. Preferably, the water in the fish tank is continuously circulated through the biofilter which preferably is submerged in the tank. Most preferably, the circulation of the water through the submerged biofilter is caused by generating a column of air bubbles from beneath the biofilter to produce an upward current therethrough. Similarly, plants in a hydroponic network may be grown by a method which includes circulating a substantially constant body of water from the hydroponic network to a fish tank assembly, as described.

Now it will be understood that in the preferred embodiment of the present invention there exist three interdependent biological systems—the fish in the fish tank, the microorganisms on the biofilter, and the plants in the hydroponic network. The relationships between these biological systems are dynamic, and a proper balance should be maintained between these systems for optimum functioning of each. When all three of the biological systems are operating efficiently, the combined fish farm and hydroponic network will offer many advantages.

The community in which the system is operating is provided with a common source of organically grown fruits, vegetables and delicious fresh fish. At the same time, the system provides a dual source of income to the operators. In this regard, it should be noted that the size of the structure can be varied from a small "family size" unit to a large commercial unit.

Because the fish tank is enclosed, its environment can be artificially controlled. In the absence of natural light and daily temperature fluctuations, the diurnal growth variations normal in outdoor fish farms are not present, and the fish will grow 24 hours a day. Moreover, because seasonal variations in climate are eliminated, the unit can be operated successfully year round in any geographic area.

Because the unit operates on a substantially constant body of water which is internally recycled, large water supplies are not required. Thus, the unit will be suitable for water-poor geographic areas and can provide an economical and plentiful source of fresh fish and vegetables not heretofore available in these regions.

The operation of the unit is cost efficient. The only major expenses are for fingerlings, fish food, water testing supplies and energy, usually electricity. However, even energy costs are minimized because in most climates a well insulated housing will provide a self-heating fish farm.

Changes may be made in the nature, composition, operation and arrangement of the various elements, steps and procedures described herein without departing from the spirit and scope of the invention as defined in the following claims.

What is claimed is:

1. A fish tank assembly, comprising:
    a fish tank adapted for containing water and fish therein;
    one or more air lines positioned at the bottom of the fish tank wherein the one or more airlines are adapted for receiving air and for releasing the air in a column of rising bubbles; and
    a biofilter characterized by a surface adapted for supporting microorganisms, wherein the surface is at least partly defined by a plurality of vertical channels, and wherein the biofilter is positioned in the fish tank so that when the tank is filled with water the biofilter will be submerged and the vertical channels will be above the one or more air lines.

2. The fish tank assembly of claim 1 wherein the dimensions of the fish tank and the dimensions and position of the one or more air lines are such that when the tank is filled with water the column of air bubbles rising from the one or more air lines will produce in the water a current which agitates substantially all the water in the fish tank.

3. The fish tank assembly of claim 2 wherein the fish tank is rectangular in shape and has two outer sides and ends, wherein the biofilter and the one or more air lines are positioned end to end in the tank along a line which longitudinally bisects the tank, and wherein the current produced by the rising air bubbles extends to both outer sides of the tank.

4. The fish tank of claim 3 wherein each half of the tank is divided into a plurality of linearly arranged compartments of graduated sizes and the tank assembly further comprises:
    a plurality of dividers removably positioned between adjacent compartments.

5. An indoor fish farm, comprising:
    an enclosure;
    a fish tank assembly disposed within the enclosure, the assembly comprising:
        a fish tank adapted for containing water and fish therein;
        one or more air lines positioned at the bottom of the fish tank wherein the one or more air lines are adapted for receiving air and for releasing the air in a column of rising bubbles; and
        a biofilter characterized by a surface adapted for supporting microorganisms capable of converting ammonia to nitrite and nitrite to nitrate, wherein the surface is at least partly defined by a plurality of vertical channels, and wherein the biofilter is positioned in the fish tank so that when the tank is filled with water the biofilter will be submerged and the vertical channels will be above the one or more air lines; and
    means for maintaining nitrate concentration in the fish water at or below selected levels.

6. The fish farm of claim 5 wherein the dimensions of the fish tank and the dimensions and position of the one or more air lines are such that when the tank is filled with water the column of air bubbles rising from the one or more air lines will produce in the water a current which agitates substantially all the water in the fish tank.

7. The fish farm of claim 6 wherein the fish tank is rectangular in shape and has two outer sides and ends, wherein the biofilter and the one or more air lines are positioned from end to end in the tank along a line which longitudinally bisects the tank, and wherein the current produced by the rising air bubbles extends to both outer sides of the tank.

8. The fish farm of claim 7 wherein each half of the tank is divided into a plurality of linearly arranged compartments of graduated sizes and the tank assembly further comprises:
    a plurality of dividers removably positioned between adjacent compartments.

9. The fish farm of claim 8 wherein the means for maintaining the nitrate concentration at a selected level further comprises:
    a hydroponic network in fluid communication with the fish tank; and means for circulating water from the fish tank through the hydroponic network and back to the fish tank.

10. The fish farm of claim 5 wherein the means for maintaining the nitrate concentration at a selected level comprises:
a hydroponic network in fluid communication with the fish tank; and
means for circulating water from the fish tank through the hydroponic network and back to the fish tank.

11. The fish farm of claim 10 wherein the dimensions of the fish tank and the dimensions and position of the one or more air lines are such that when the tank is filled with water the column of air bubbles rising from the one or more air lines will produce in the water a current which agitates substantially all the water in the fish tank.

12. The fish farm of claim 11 wherein the fish tank is is rectangular in shape and has two outer sides and ends, wherein the biofilter and the one or more air lines are positioned from end to end in the tank along a line which longitudinally bisects the tank, and wherein the current produced by the rising air bubbles extends to both outer sides of the tank.

13. A combined hydroponic greenhouse and fish farm comprising:
an enclosed fish tank adapted for containing a body of water and fish therein;
an enclosed hydroponic network in fluid communication with the fish tank; and
means for circulating water from the fish tank, through the hydroponic network and back to the fish tank;
one or more air lines positioned at the bottom of the fish tank wherein the one or more air lines are adapted for receiving air and for releasing the air in a column of rising bubbles; and
a biofilter characterized by a surface adapted for supporting microorganisms capable of converting ammonia to nitrite and nitrite to nitrate, wherein the surface is at least partly defined by a plurality of vertical channels, and wherein the biofilter is positioned in the fish tank so that when the tank is filled with water the biofilter will be submerged and the vertical channels will be above the one or more air lines;
and
means for continuously circulating the water in the fish tank through the biofilter.

14. The combined hydroponic greenhouse and fish farm of claim 13 wherein the dimensions of the fish tank and the dimensions and position of the one or more air lines are such that when the tank is filled with water the column of air bubbles rising from the one or more air lines will produce in the water a current which agitates substantially all the water in the fish tank.

15. The combined hydroponic greenhouse and fish farm of claim 14 wherein the fish tank is rectangular in shape and has two outer sides and ends, wherein the biofilter and the one or more air lines are positioned from end to end in the tank along a line which longitudinally bisects the tank, and wherein the current produced by the rising air bubbles extends to both outer sides of the tank.

16. The combined hydroponic greenhouse and fish farm of claim 15 wherein each half of the tank is divided into a plurality of linearly arranged compartments of graduated sizes, and further comprising:
a plurality of dividers in the fish tank removably positioned between adjacent compartments.

17. A method for growing fish comprising:
maintaining the growing fish in an enclosed fish tank;
circulating water from the fish tank through a hydroponic network and back to the fish tank; and
introducing air into one or more air lines at the bottom of the fish tank under a biofilter having a surface defined in part by vertical channels, so that the air is released in columns of bubbles which rise through the vertical channels of the biofilter, whereby water in the fish tank is circulated through the biofilter.

18. A method for growing plants in a hydroponic network, comprising:
circulating a substantially constant body of water between the hydroponic network and a fish tank assembly in fluid communication with the hydroponic network, wherein the fish tank assembly comprises:
an enclosed fish tank adapted for containing a portion of the body of water and fish therein;
one or more air lines positioned at the bottom of the fish tank, wherein the one or more air lines are adapted for receiving air and for releasing air; and
a biofilter supported in the fish tank over the one or more air lines, the biofilter having a surface supporting microorganisms capable of converting ammonia to nitrite and nitrite to nitrate, wherein the surface is at least partly defined by vertical channels; and
introducing air into the one or more air lines whereby air is released from the one or more air lines in columns of bubbles rising through the vertical channels of the biofilter, thereby aerating the water in the fish tank and creating a current whereby water in the fish tank is circulated therein.

* * * * *